United States Patent
Takasuga

[19]
[11] Patent Number: 5,858,165
[45] Date of Patent: Jan. 12, 1999

[54] MECHANISM FOR RETAINING BEAD WITH FILLER

[75] Inventor: Yutaka Takasuga, Tokyo, Japan

[73] Assignee: Bridgestone Corporation, Tokyo, Japan

[21] Appl. No.: 786,902

[22] Filed: Jan. 23, 1997

[30] Foreign Application Priority Data

Jan. 25, 1996 [JP] Japan .................................. 8-031270

[51] Int. Cl.⁶ .................................................. B29D 30/32
[52] U.S. Cl. ........................................ 156/403; 156/406.2
[58] Field of Search .............................. 156/406.2, 398, 156/403, 421.8, 396

[56] References Cited

U.S. PATENT DOCUMENTS

| | | | |
|---|---|---|---|
| 4,105,486 | 8/1978 | Cantarutti | 156/406.2 |
| 4,437,920 | 3/1984 | Kubo | 156/406.2 |
| 4,964,931 | 10/1990 | Ring | 156/403 |
| 5,051,149 | 9/1991 | Ishii | 156/403 |
| 5,156,713 | 10/1992 | Ishii et al. | 156/396 |
| 5,273,613 | 12/1993 | Sato et al. | 156/406.2 |
| 5,441,587 | 8/1995 | Byerley | 156/406.2 |

FOREIGN PATENT DOCUMENTS

| | | |
|---|---|---|
| 0 391 834 A1 | 10/1990 | European Pat. Off. . |
| 39 10 886 A1 | 10/1989 | Germany . |
| 1-190438 | 7/1989 | Japan . |
| 852632 | 8/1981 | U.S.S.R. .............................. 156/406.2 |

*Primary Examiner*—Geoffrey L. Knable
*Attorney, Agent, or Firm*—Sughrue, Mion, Zinn, Macpeak & Seas, PLLC

[57] ABSTRACT

The mechanism comprising: a ring body; a plurality of extending/retracting means which are separately provided at the ring body at equal intervals in the circumferential direction of the ring body; an arc-shaped retaining body which is provided at each of the plurality of the extending/retracting means and which can retain a bead with a filler; and driving means which applies driving force to the extending/retracting means and synchronously operates the extending/retracting means so as to move and extend/retract the retaining body in the radial direction of the ring body, the extending/retracting means further including: a pair of swing links which are separately disposed in the radial direction of the ring body, and the base end portions of the swing links being rotatably connected to the ring body; and a connecting link which is rotatably connected to each of the distal end portions of the pair of swing links, and the retaining body being provided at the inner end portion of the connecting link wherein, when the extending/retracting means is driven by the driving means and the extending line of the connecting link practically intersects the central axis of the ring body, all of the plurality of the retaining bodies are positioned on the same circle which centers around the central axis of the ring body.

12 Claims, 3 Drawing Sheets

MECHANISM FOR RETAINING BEAD WITH FILLER

BACKGROUND OF THE INVENTION

1. Field of the Invention

The present invention relates to a mechanism for retaining a bead with a filler.

2. Description of the Related Art

As a conventional mechanism for retaining a bead with a filler, for example, the mechanism disclosed in JP-Application Laid-Open No. 1-190438 is well known. The mechanism comprises: a ring body, a plurality of extending/retracting means which are separately provided at the ring body in the circumferential direction thereof. An arc-shaped retaining body is provided at each of the extending/retracting means and which can retain a bead with a filler. A driving means applies driving force to the extending/retracting means and operates synchronously these extending/retracting means so as to move and extend/retract the retaining body in the radial direction of the ring body. Each of the extending/retracting means includes a linear guide which is mounted to the ring body and a movable rod which is movably supported by the linear guide in the radial direction of the ring body, and the radially extending line thereof intersects the central axis of the ring body, with the inner end portion thereof being provided with the retaining body.

In a case in which a bead with a filler is retained by such mechanism, the movable rod of each of the extending/retracting means is moved by the driving means inwardly in the radial direction of the ring body. Accordingly, the retaining bodies reach the predetermined positions in the radial direction of the ring body and all of the arc-shaped retaining bodies are positioned on the same circle which centers around the central axis of the ring body. Thereafter, a bead with a filler is supplied to and retained by the retaining body. Then, the bead with the filler retained as such is delivered from the retaining body to a tire forming drum. After such delivery, in order to prevent a case in which the retaining body interferes with the filler whose radius is larger than that of the bead, the movable rod of each of the extending/retracting means is moved by the driving means outwardly in the radial direction of the ring body. The retaining body is moved further outward in the radial direction of the ring body than the outer end of the filler in the radial direction thereof.

However, in such conventional mechanism for retaining a bead with a filler, the linear guide itself is expensive. Moreover, because the linear guide has large sliding resistance, it is necessary to use expensive driving means which can generate large driving force. As a result, a drawback arises in that cost of equipment becomes high. Further, in order to operate smoothly the aforementioned linear guide and movable rod, the retaining mechanism must be assembled and adjusted at high accuracy. Additionally, there is a drawback in that high accuracy must be maintained for a long period of time. Further, in the aforementioned retaining mechanism, when the retaining body is moved outermost in the radial direction of the ring body, the outer portion of the movable rod in the radial direction of the ring body projects from the ring body outwardly in the radial direction thereof by a large amount. Thus, a drawback arises in that the entire retaining mechanism becomes large.

SUMMARY OF THE INVENTION

An object of the present invention is to provide a mechanism for retaining a bead with a filler which is small, inexpensive, and in which maintenance of accuracy can be simplified.

The object of the present invention can be achieved in accordance with the following descriptions. Firstly, a mechanism for maintaining a bead with a filler, comprising: a ring body; a plurality of extending/retracting means which are separately provided at the ring body in the circumferential direction of said ring body; an arc-shaped retaining body which is provided at each of the plurality of said extending/retracting means and which can retain a bead with a filler; and driving means which applies driving force to said extending/retracting means and synchronously operates said extending/retracting means so as to move and extend/retract said retaining body in the radial direction of the ring body, said extending/retracting means further including: a pair of parallel links separated in the radial direction of the ring body and disposed parallel to each other, and the base end portions of the parallel links being rotatably connected to said ring body; and a connecting link which is rotatably connected to the distal end portions of said pair of parallel links, and said retaining body being provided at the inner end portion of the connecting link wherein, when the lengths of said parallel links are the same and the extending line of said connecting link practically intersects with the central axis of said ring body, all of the plurality of said retaining bodies are positioned on the same circle which centers around the central axis of said ring body.

Secondly, a mechanism for maintaining a bead with a filler, comprising: a ring body; a plurality of extending/retracting means which are separately provided at the ring body in the circumferential direction of said ring body; an arc-shaped retaining body which is provided at each of the plurality of said extending/retracting means and which can retain a bead with a filler; and driving means which applies driving force to said extending/retracting means and synchronously operates said extending/retracting means so as to move and extend/retract said retaining body in the radial direction of the ring body, said extending/retracting means further including: a pair of swing links separated in the radial direction of the ring body and disposed substantially parallel to each other, and the base end portions of the swing links being rotatably connected to said ring body; and a connecting link which is rotatably connected to the distal end portions of said pair of swing links, and said retaining body being provided at the inner end portion of the connecting link wherein, among said swing links, the length of the swing link positioned at the radial direction outer side is longer than the length of the swing link positioned at the radial direction inner side, and when the extending line of said connecting link practically intersects the central axis of said ring body, all of the plurality of said retaining bodies are positioned on the same circle which centers around the central axis of said ring body.

Thirdly, a mechanism for maintaining a bead with a filler, comprising: a ring body; a plurality of extending/retracting means which are separately provided at the ring body in the circumferential direction of said ring body; an arc-shaped retaining body which is provided at each of the plurality of said extending/retracting means and which can retain a bead with a filler; and driving means which applies driving force to said extending/retracting means and synchronously operates said extending/retracting means so as to move and extend/retract said retaining body in the radial direction of the ring body, said extending/retracting means further including: a pair of swing links separately disposed in the radial direction of the ring body, and the base end portions of the swing links being rotatably connected to said ring body; and a connecting link which is rotatably connected to the distal end portions of said pair of swing links, and said retaining body being provided at the inner end portion of the connecting link wherein, among said swing links, the length of the swing link positioned at the radial direction outer side is shorter than the length of the swing link positioned at the radial direction inner side, and when the extending line of said connecting link practically intersects the central axis of said ring body, all of the plurality of said retaining bodies are positioned on the same circle which centers around the central axis of said ring body.

In a case in which the bead with the filler is retained by the retaining mechanism having the above-described first structure, driving force is applied from the a driving means to each of the extending/retracting means, and the parallel links swing around the base end portion to the radial direction inner side. The connecting link is synchronized with the parallel links and moved to the radial direction inner side. At this time, since the base end portions of the parallel links are rotatably connected to the ring body, the extending line of the connecting link gradually moves closer toward or away from the central axis of the ring body due to the aforementioned swings of the parallel links in the radial direction inner side. When the extending line of the connecting link moves closer to the central axis of the ring body and the parallel link swings to the position at which the extending line intersects the central axis, each of the retaining bodies reaches the predetermined position in the radial direction of the ring body, and all of the arc-shaped retaining bodies are positioned on the same circle, which is centered around the central axis of the ring body and which has the predetermined radius. Thus, the bead with the filler having the predetermined radius can be retained. In this state, the bead with the filler having the predetermined radius is supplied to and retained by the retaining body. Thus, in the present invention, only when the retaining body retains the bead with the filler (when the retaining body is positioned at the predetermined position in the radial direction of the ring body), these arc-shaped retaining bodies are positioned to superpose on the same circle having a predetermined radius, i.e., so as to superpose on the bead correctly. Retention is thereby reliably effected. When the retaining bodies deviate from the predetermined positions in the radial direction of the ring body to any positions in the radial direction thereof, these retaining bodies are not correctly superposed on the bead and are superposed on the bead in a slightly inclined state. Retention may therefore be insufficient. As mentioned before, since the movement of the retaining body in the radial direction of the ring body is effected by the swings of the parallel links, it is not necessary to use an expensive linear guide. Moreover, because the swinging resistance of the parallel links is remarkably smaller than the sliding resistance of the linear guide, it suffices if the driving means which is small, inexpensive and which generates a small driving force is used. Further, as described above, since the links are used for swinging, the retaining mechanism can be operated smoothly over a long period of time in a state in which the necessary accuracy is maintained in a simple way. As a result, maintenance of accuracy of the retaining mechanism can be simplified. Still further, it is not necessary that the connecting link extends to the radial direction outer side further than the area which connects the connecting link and the parallel link positioned at the radial direction outer side. Therefore, it is possible to prevent the case in which the connecting link protrudes from the ring body to the radial direction outer side. The entire retaining mechanism can be made compact.

Further, according to the other structure described above, when the retaining body moves from the predetermined position in the radial direction of the ring body to the radial direction outer side and the extending line of the connecting link moves away from the central axis of the ring body, since the connecting link is influenced by the difference between the length of the swing link positioned at the radial direction outer side and the length of the swing link positioned at the radial direction inner side, the connecting link inclines so that the extending line of the connecting link approaches the central axis of the ring body. Accordingly, these movements offset each other, and the extending line of the connecting link practically intersects the central axis of the ring body from the predetermined position at which the retaining body is placed in the radial direction of the ring body to the position at the radial direction outer side which is slightly away from the predetermined position. The same holds true for the case in which the retaining body moves to the radial direction inner side. As a result, even if all of the retaining bodies slightly move from the predetermined positions in the radial direction of the ring body to the radial direction outer side or to the radial direction inner side, the extending line of the connecting link practically intersects the central axis of the ring body. The beads with the fillers having slightly different radii can be retained. Additionally, according to the still other structure, similarly to the above-described structures, the two movements offset each other, and the beads with the fillers having slightly different radii can be retained. Other operations are the same as those of above-described first structure.

DESCRIPTION OF THE PREFERRED EMBODIMENTS

The first embodiment of the present invention will be explained hereinafter on the basis of the drawings.

Figure 1:
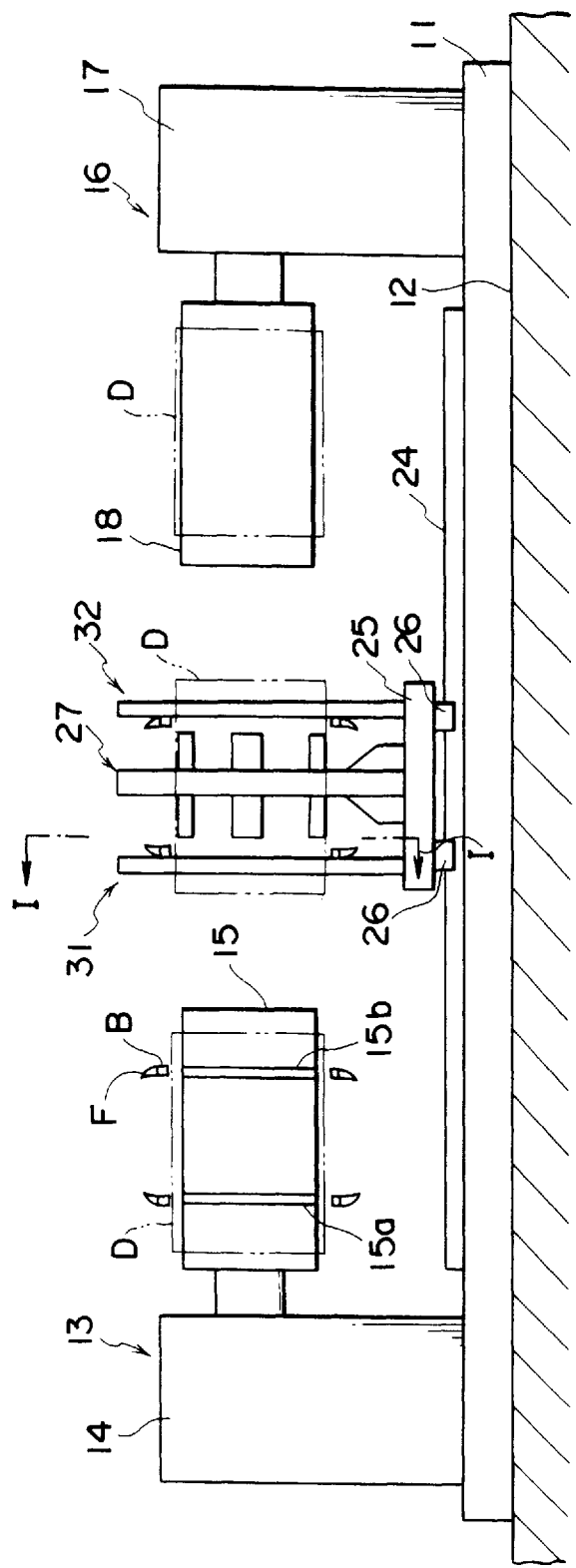
FIG. 1 is a schematic elevational view illustrating a first embodiment of the present invention.
Figure 2:
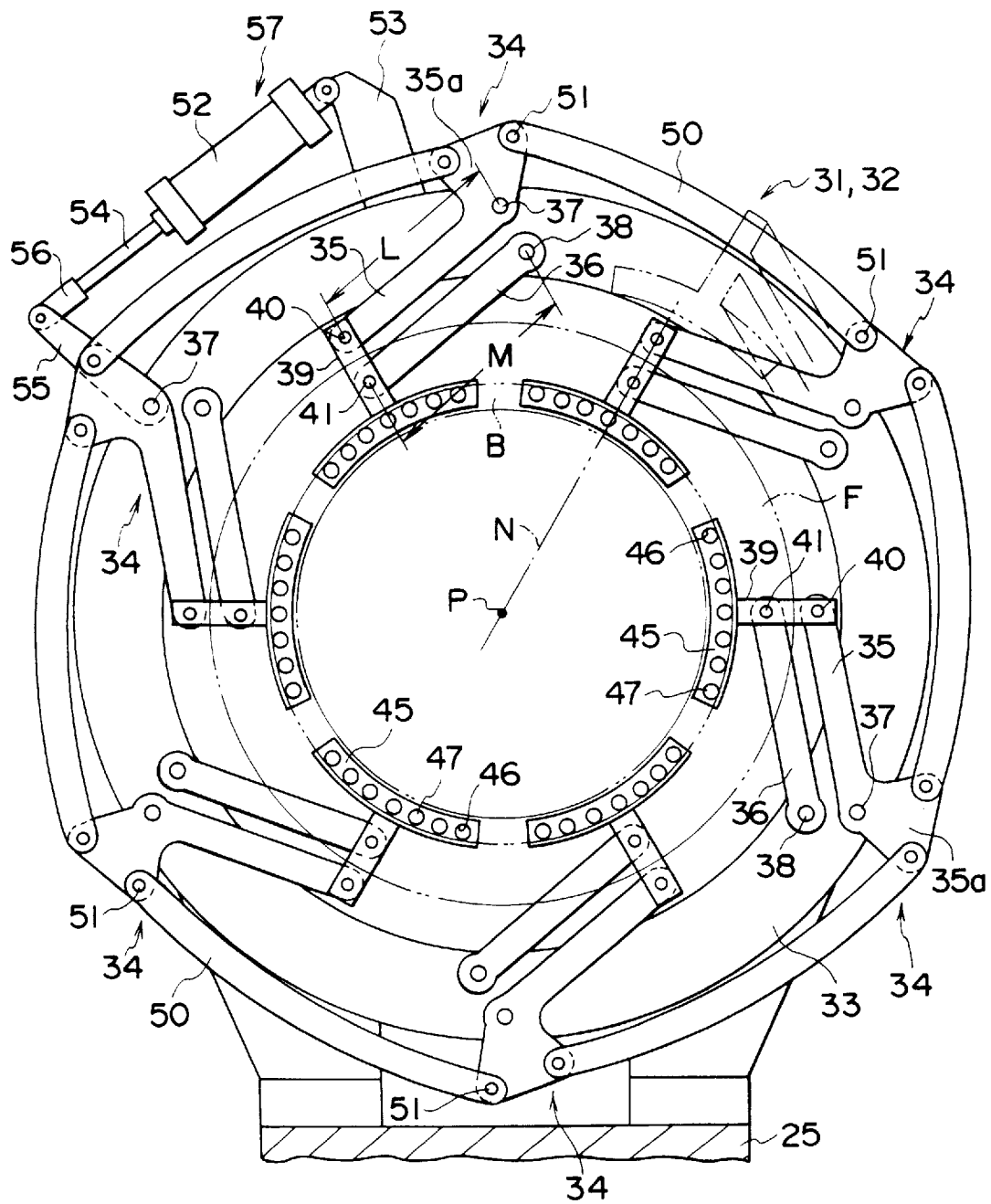
FIG. 2 is a cross sectional view, taken along line I—I in FIG. 1.
Figure 3:
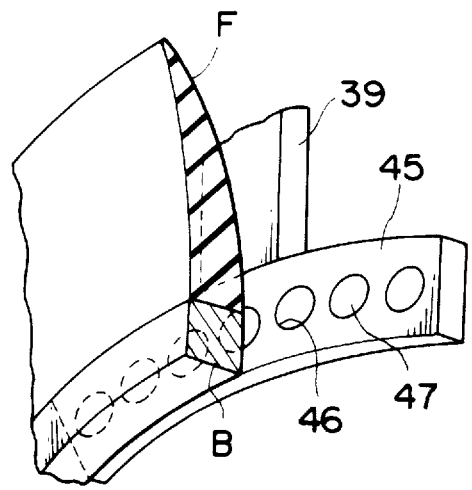
FIG. 3 is a perspective view, in which the portion of a vicinity of a retaining body is broken.

In FIGS. 1, 2 and 3, a base 11 is disposed on a floor surface 12. A tire forming device 13 is disposed at one end portion of the base 11. The tire forming device 13 includes a driving portion 14 and a tire forming drum 15, which is provided at the other side (i.e., the righthand side) of the driving portion 14 and is driven and rotated by the driving portion 14. Bead supporting portions 15a, 15b, which are movable in the radial direction of the tire forming drum 15, are disposed at the axial direction end portions of the tire forming drum 15. Moreover, a band forming device 16 is provided at the other end portion of the base 11. The band forming device 16 includes a driving portion 17 and an extendible/retractable band forming drum 18 which is provided at one side (i.e., the left-hand side) of the driving portion 17 and is driven and rotated by the driving portion 17. The band forming drum 18 is coaxial with the above-described tire forming drum 15. When a tire forming material, e.g., carcass ply, is supplied to the band forming drum 18 which is being driven and rotated by the above-described driving portion 17, the tire forming material is wound around the periphery of the band forming drum 18 to form a cylindrical band D. A pair of guide rails 24 are placed on the base 11 and extend parallel to the axis of the tire forming drum 15. Slide bearings 26, which are fixed to the lower surface of the movable frame 25, slidably engage with the guide rails 24. When the movable frame 25 receives moving force from a moving means, (not installed) the movable frame 25 moves along the axis of the band D while being guided by the guide rails 24. A band retaining mechanism 27, which can retain the band D from the outer side thereof, is provided at the central portion of the movable frame 25.

Retaining mechanisms 31, 32 are respectively provided at one end portion of the movable frame 25 and the other end portion thereof. Each of the retaining mechanisms 31, 32 is coaxial with the axis of the tire forming drum 15 and includes a ring body 33 which stands upright having an internal radius larger than that of the band D. A plurality of (here, six) extending/retracting means 34 are provided at the ring body 33 at equal intervals in the circumferential direction thereof. Each of the extending/retracting means 34 includes a pair of parallel links 35, 36 whose base end portions are rotatably connected to the ring body 33 via pins 37, 38. These parallel links 35, 36 are separated in the radial direction of the ring body 33 and are disposed parallel to each other. A connecting link 39 rotatably connects the distal end portions of the parallel links 35, 36 via pins 40, 41 and extend substantially in the radial direction of the ring body 33. The radial direction outer end of the connecting link 39 ends at the distal end of the parallel link 35 and does not project further than the radial direction outer side. Here, a distance L, i.e., the length L of the parallel link 35, is a distance between a point (the central axis of the pin 40) which connects the connecting link 39 and the parallel link 35 and a point (the central axis of the pin 37) which connects the parallel link 35 and the ring body 33. A distance M, i.e., the length M of the parallel link 36, is a distance between a point (the central axis of the pin 41) which connects the connecting link 39 and the parallel link 36 and a point (the central axis of the pin 38) which connects the parallel link 36 and the ring body 33. The distance L is equal to the distance M. Moreover, a line which connects the central axes of the pins 40, 41 is parallel to a line which connects the central axes of the pins 37, 38. As a result, even if the parallel links 35, 36 swing, the connecting link 39 always faces the same direction. However, since the extending line N slightly deviates in the circumferential direction of the ring body 33 due to the swings of the parallel links 35, 36, only when the parallel links 35, 36 form a predetermined inclined angle with respect to the radial direction of the ring body 33, the extending line N practically intersects the central axis P of the ring body 33. Further, a substantially triangular connecting portion 35a is integrally formed at the base end portion of the parallel link 35. As a whole, the aforementioned parallel links 35, 36 and the connecting link 39 form the extending/retracting means 34.

An arc-shaped retaining body 45, which extends substantially along a ring body 33, is removably mounted to each of the extending/retracting means 34, more specifically, to the inner end portion of the connecting link 39 in the radial direction of the ring body 33. When the extending line N practically intersects the central axis P, the radius of curvature of the retaining body 45 is equal to the distance between the central axis P and the point at which the retaining body 45 is positioned. As a result, when the extending line N practically intersects the central axis P, all of the retaining bodies 45 are positioned (superposed) on the same circle which centers around the central axis P of the ring body 33 and which has a predetermined radius. A plurality of accommodating holes 46 are respectively formed on the side surface (end surface) of the retaining body 45 at equal intervals in the circumferential direction thereof. A permanent magnet 47, which attracts and retains a bead B with a filler F, is accommodated and fixed to the respective accommodating holes 46. In a case in which the radius of the retained bead B with the filler F is changed, the retaining body 45 is replaced with the one having the radius of curvature in accordance with the bead B.

An arc-shaped connecting rod 50 connects the extending/retracting means 34. The both ends of the connecting rod 50 are rotatably connected to the connecting portions 35a of the adjacent parallel links 35 via pins 51. The head side of a cylinder 52 is rotatably connected to the ring body 33 via a bracket 53. A transmitting arm 55, which is fixed to the pin 37 of any of the extending/retracting means 34, is rotatably connected to the distal end of a piston rod 54 of the cylinder 52. As a result, when the cylinder 52 is operated to project or retract the piston rod 54, due to the transmitted driving force, the parallel links 35, 36 of each of the extending/retracting means 34 swing synchronously to the radial direction inner side or the radial direction outer side via the connecting rod 50. Accordingly, the retaining body 45 is moved to the radial direction inner side or to the radial direction outer side. As a whole, the aforementioned connecting rods 50 and the cylinder 52 apply driving force to each of the extending/retracting means 34 and operate synchronously the extending/retracting means 34. Accordingly, driving means 57 which moves and extends/retracts the retaining body 45 in the radial direction of the ring body 33 is formed.

Next, the operation of the first embodiment of the present invention will be explained.

It is assumed that the formed cylindrical band D is supported on the band forming drum 18 of the band forming device 16, and that a formed green tire is supported on the tire forming drum 15 of the tire forming device 13. At this time, the movable frame 25 waits between the band forming drum 18 and the tire forming drum 15. When the movable frame 25 waits in this manner, the beads B with the fillers F are respectively delivered to and held at the holding mechanisms 31, 32. In this case, at first, the cylinder 52 of the holding mechanisms 31, 32 is operated to project the piston rod 54, and the driving force from the cylinder 52 is applied to each of the extending/retracting means 34 via the connecting rod 50. Accordingly, while the parallel links 35, 36 of the extending/retracting means 34 maintain a parallel relationship, the parallel links 35, 36 swing around the base end portions, i.e., the pins 37, 38, from the position shown by an imaginary line in FIG. 2 to the radial direction inner side. The parallel links 35, 36 synchronize with the connecting link 39 and are moved to the radial direction inner side. At this time, since the base end portions of the parallel links 35, 36 are rotatably connected to the ring body 33 via the pins 37, 38, the extending line N of the connecting link 39 deviates in the circumferential direction of the ring body 33 due to the swings of the aforementioned parallel links 35, 36. At first, the extending line N gradually moves away from the central axis P of the ring body 33, and thereafter, the extending line N gradually moves closer to the central axis P thereof. When the retaining body 45 moves in the radial direction of the ring body 33 in this way, the retaining body 45 slightly deviates in the circumferential direction (transverse direction) of the ring body 33. At this time, because the retaining body 45 does not retain the bead B with the filler F, the problem does not occur. When the parallel links 35, 36 swing to the position at which the extending line N of the connecting link 39 practically intersects the central axis P of the ring body 33, each of the retaining bodies 45 reaches a predetermined position in the radial direction shown by a solid line in FIG. 2. As a result, all of the arc-shaped retaining bodies 45 are positioned (superposed) on the same circle which centers around the central axis P and has a predetermined radius. Thus, the bead B with the filler F having the predetermined radius can be retained by the retaining body 45. In this state, the bead B with the filler F having the predetermined radius is supplied to and retained by each of the retaining bodies 45. In this way, in the first embodiment, only when the retaining body 45 retains the bead B with the filler F (when the retaining body 45 is in the predetermined position in the radial direction of the ring body 33), these retaining bodies 45 are positioned on the same circle having the predetermined radius, i.e., correctly superposed on the bead B. Retention is thereby reliably effected. When the retaining bodies 45 deviate from the predetermined positions in the radial direction of the ring body 33 to any positions in the radial direction, these retaining bodies 45 are not correctly superposed on the bead B and are superposed in a slightly inclined state. Accordingly, it is possible that retention is not sufficiently effected.

Next, the moving means is operated. The movable frame 25, the band retaining mechanism 27, and the retaining mechanisms 31, 32 are integrally moved to the other side. When the band retaining mechanism 27 reaches the predetermined position of the band D in the outer side thereof (the position at which the center of the band retaining mechanism 27 coincides with the axial direction center of the band D), the above movement is stopped. Next, the band D is retained from the outer side thereof by the band retaining mechanism 27 and the radius of the band forming drum 18 is decreased. Then, the band D is delivered from the band forming drum 18 to the band retaining mechanism 27. At this time, the bead supporting portions 15a, 15b of the tire forming drum 15 are moved to the radial direction inner side and the retention of the formed green tire is released. At the same time, the released green tire is conveyed by a conveying device (not illustrated).

Next, the moving means is operated again. The movable frame 25, the band retaining mechanism 27 which retains the band D, and the retaining mechanisms 31, 32 which retain the beads B with the fillers F are integrally moved to one side. When the band D reaches the predetermined position (the position at which the axial direction center of the band D coincides with the axial direction center of the tire forming drum 15 and at which the beads B with the fillers F superpose the bead supporting portions 15a, 15b), the above movement is stopped. Next, the bead supporting portions 15a, 15b are moved to the radial direction outer side (the radii thereof are increased) and the beads B with the fillers F are retained from the inner sides thereof via the band D. As a result, the beads B with the fillers F are set to predetermined positions on the band D. Subsequently, the cylinder 52 of the retaining mechanisms 31, 32 is operated so as to withdraw the piston rod 54. As a result, the parallel links 35, 36 of the extending/retracting means 34 synchronously swing to the radial direction outer side, and the retaining body 45 is removed from the bead B with the filler F. At this time, the band retaining mechanism 27 is also removed from the band D. Consequently, the band D and the bead B with the filler F are delivered to the tire forming drum 15 from the band retaining mechanism 27 and the retaining mechanisms 31, 32. When the retaining body 45 is moved to the outermost position in the radial direction shown by the imaginary line in FIG. 2, the operation of the cylinder 52 is stopped. At this time, the connecting link 39 does not extend to the radial direction outer side further than the area which connects the parallel link 35, which is positioned at the radial direction outer side, and the connecting link 39 (the connecting link 39 ends at the above-described connecting area). Accordingly, even if the connecting link 39 moves to the outermost side in the radial direction, the connecting link 39 can not protrude from the ring body 33 and the connecting rod 50 to the radial direction outer side. Thus, the entire retaining mechanisms 31, 32 can be made compact. Moreover, as mentioned above, since the movement of the retaining body 45 in the radial direction of the ring body 33 is effected by the swings of the parallel links 35, 36, it is not necessary to use an expensive linear guide. Further, because the swinging resistance of the parallel links is remarkably smaller than the sliding resistance of a linear guide, it suffices if the driving means which is small, inexpensive, and which generates small driving force is used (here, the cylinder 52 is used). Moreover, at this time, since the driving means is used only for swinging the parallel links 35, 36, the retaining mechanisms 31, 32 can be smoothly operated for a long period of time in a state in which the necessary accuracy is maintained in a simple way. Accordingly, the maintenance of the accuracy of the retaining mechanisms 31, 32 can be simplified.

Next, the moving means is operated. The movable frame 25, the band retaining mechanism 27 which is empty, and the retaining mechanisms 31, 32 are integrally moved to the other side and returned to the initial standby positions. With this movement, because the retaining bodies 45 of the retaining mechanisms 31, 32 are withdrawn by a large amount from the predetermined positions in the radial direction of the ring body 33, at which the beads B with the fillers F are retained as mentioned above, to the radial direction outer side, the retaining bodies 45 do not contact the fillers F. At the above operation, in the band forming device 16, after the radius of the band forming drum 18 is increased, while the band forming drum 18 is rotated by the driving portion 17, the tire forming member is supplied to and wound around the periphery of the band forming drum 18 to form the band D. On the other hand, in the tire forming device 13, while the bead supporting portions 15a, 15b are approached to each other, air is injected into the band D between the beads B with the fillers F so as to deform the band D between the beads B with the fillers F into a troidal shape. At the same time, the axial direction outer side of the band D with respect to the beads B with the fillers F is folded around the beads B by a bladder, (not illustated) and thereafter, a belt tread band is supplied and adhered to the outer side of the troidal-shaped band D. As a result, a green tire is formed. One cycle of the operation of the first embodiment of the present invention was described hereinabove. The cycle is repeated thereafter so that the green tire is successively formed.

Figure 4:
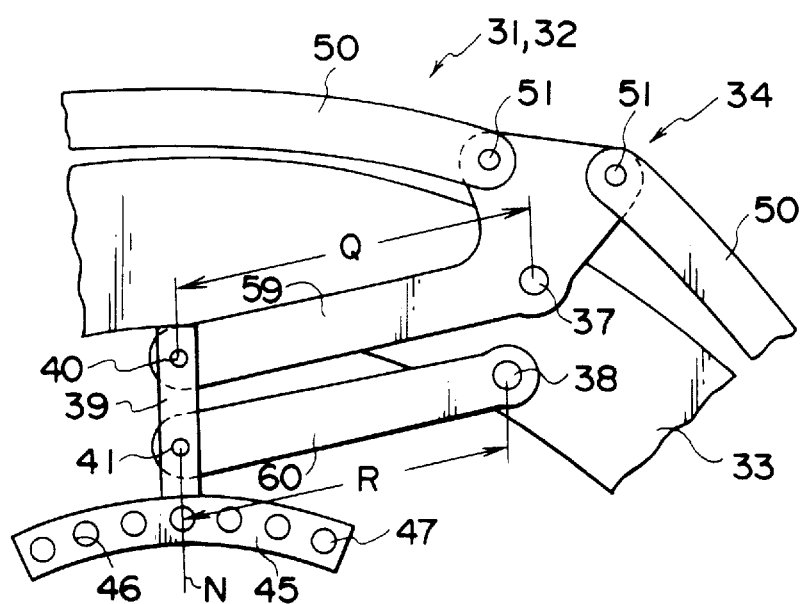
FIG. 4 is a partial side view illustrating a second embodiment of the present invention.

FIG. 4 illustrates the second embodiment of the present invention. In the second embodiment, instead of the pair of parallel links 35, 36 which have the same length, a pair of swing links 59, 60 are used which are substantially parallel to each other and in which the length Q of the link 59 positioned at the radial direction outer side is slightly longer than the length R of the link 60 positioned at the radial direction inner side. In this way, the swing links 59, 60 swing outwardly in the radial direction of the ring body 33, the retaining body 45 moves from the predetermined position in the radial direction of the ring body 33 to the radial direction outer side, and the extending line N of the connecting link 39 deviates from the central axis P of the ring body 33. At this time, since the connecting link 39 is influenced by the difference between the length Q of the swing link 59 positioned at the radial direction outer side and the length R of the swing link 60 positioned at the radial direction inner side, the connecting link 39 inclines so that the extending line N of the connecting link 39 approaches the central axis P of the ring body 33. Accordingly, these movements offset each other, and the extending line N of the connecting link 39 practically intersects the central axis P of the ring body 33 from the predetermined position at which the retaining body 45 is placed in the radial direction of the ring body 33 to the position at the radial direction outer side which is slightly away from the predetermined position. The same holds true for the case in which the retaining body 45 moves in the radial direction inner side. As a result, even if all of the retaining bodies 45 slightly move from the predetermined positions in the radial direction of the ring body 33 to the radial direction outer side or to the radial direction inner side, the extending line N of the connecting link 39 practically intersects the central axis P of the ring body 33. The beads B with the fillers having slightly different radii thus can be retained. In a case in which the radius of the retaining bead B with the filler is changed, the retaining body 45 is replaced by the one having the radius of curvature in accordance with the retaining bead B. Other structures and operations of the second embodiment are the same as those of the first embodiment.

Further, in the present invention, instead of the pair of parallel links 35, 36 which have the same length, a pair of swing links are used in which the length Q of the link positioned at the radial direction outer side is slightly shorter than the length R of the link positioned at the radial direction inner side and, for example, as from the base ends to the distal ends thereof, the distance between the links become narrow. In this case as well, similar to the abovedescribed second embodiment, the two movements offset each other, and the beads with the fillers having slightly different radii can be retained.

As described above, the present invention provides a mechanism for retaining a bead with a filler which can be small, inexpensive, and in which maintenance of accuracy can be simplified.

What is claimed is:

1. A mechanism for maintaining a bead with a filter, comprising:
    a ring body;
    a plurality of extending/retracting means which are separately provided at the ring body at equal intervals in the circumferential direction of said ring body;
    an arc-shaped retaining body which is provided at each of the plurality of said extending/retracting means and which can retain a bead with a filler; and
    driving means which applies a driving force to said extending/retracting means and synchronously operates said extending/retracting means so as to move and extend/retract said retaining body in the radial direction of the ring body,
    said extending/retracting mans further including:
        a pair of parallel links whose lengths are the same, said parallel links being separated in the radial direction of the ring body and disposed parallel to each other, and the base end portions of the parallel links being rotatably connected to said ring body; and
        a connecting link which is rotatably connected to each of the distal end portions of said pair of parallel links, and said retaining body being provided at the inner end portion of the connecting link wherein, when said extending/retracting means is driven by said driving means and the extending line of said connecting link practically intersects with the central axis of said ring body, all of the plurality of said retaining bodies are positioned on the same circle which centers around the central axis of said ring body, wherein said pair of links are arranged in the circumferential direction of said body; and said driving means comprising:
    a cylinder rotatable connected at one end thereof to said ring body via a bracket, a piston rod accommodated in said cylinder in such a manner as to extend form or retract into the other end of said cylinder, a transmitting arm which is connected at one end thereof to said piston rod, and is fixed to any of the plurality of said extending/retracting means at the other end; and
    a plurality of connecting rods for transmitting driving force, the driving force being transmitted from said cylinder to said extending/retracting means, which is connected to the transmitting arm, via the transmitting arm.

2. A mechanism for retaining a bead with a filler according to claim 1, wherein each of the plurality of said connecting rods is connected to the adjacent base end portion of the radial direction outer side link, among said pair of parallel links of the plurality of said extending/retracting means.

3. A mechanism for retaining a bead with a filler according to claim 2, wherein the base end portion of the parallel link positioned at the radial direction outer side of said parallel links is substantially triangle.

4. A mechanism for retaining a bead with a filler according to claim 1, wherein the radial direction outer end of said connecting link ends at the distal end of the parallel link at the radial direction outer side of said parallel links.

5. A mechanism for maintaining a bead with a filler, comprising:
    a ring body;
    a plurality of extending/retracting means which are separately provided at the ring body at equal intervals in the circumferential direction of said ring body;
    an arc-shaped retaining body which is provided at each of the plurality of said extending/retracting means and which can retain a bead with a filler; and
    driving means which applies a driving force to said extending/retracting means and synchronously operates said extending/retracting means so as to move and extend/retract said retaining body in the radial direction of the ring body,
    said extending/retracting means further including:
        a pair of swing links whose lengths are different, the swing links being separated in the radial direction of the ring body and disposed substantially parallel to each other, and the base end portions of the swing links being rotatably connected to said ring body; and
        a connecting link which is rotatably connected to each of the distal end portions of said pair of swing links, and said retaining body being provided at the inner end portion of the connecting link
    wherein, among said swing links, the length of the swing link positioned at the radial direction outer side is longer than the length of the swing link positioned at the radial direction inner side, an when said extending/retracting means is driven by said driving means and the extending line of said connecting link practically intersects the central axis of said ring body, all of the plurality of said retaining bodies are positioned on the same circle which centers around the central axis of said ring body;

wherein said pair of links are arranged in the circumferential direction of said body; and said driving means comprising:

a cylinder rotatable connected at one end thereof to said ring body via a bracket, a piston rod accommodated in said cylinder in such a manner as to extend from or retract into the other end of said cylinder, a transmitting arm which is connected at one end thereof to said piston rod, and is fixed to any of the plurality of said extending/retracting means at the other end; and a plurality of connecting rods for transmitting driving force, the driving force being transmitted from said cylinder to said extending/retracting means, which is connected to the transmitting arm, via the transmitting arm.

6. A mechanism for retaining a bead with a filler according to claim 5, wherein each of the plurality of said connecting rods is connected to the adjacent base end portion of the radial direction outer side link, among said pair of swing links of the plurality of said extending/retracting means.

7. A mechanism for retaining a bead with a filler according to claim 6, wherein the base end portion of the swing link positioned at the radial direction outer side of said swing links is substantially triangle.

8. A mechanism for retaining a bead with a filler according to claim 5, wherein the radial direction outer end of said connecting link ends at the distal end of the swing link at the radial direction outer side of said swing links.

9. A mechanism for maintaining a bead with a filler, comprising:

a ring body;

a plurality of extending/retracting means which are separately provided at the ring body at equal intervals in the circumferential direction of said ring body;

an arc-shaped retaining body which is provided at each of the plurality of said extending/retracting means and which can retain a bead with a filler; and driving means which applies a driving force to said extending/retracting means and synchronously operates said extending/retracting means so as to move and extend/retract said retaining body in the radial direction of the ring body, said extending/retracting means further including:

a pair of swing links whose lengths are different, the swing links being separately disposed in the radial direction of the ring body, and the base end portions of the swing links being rotatably connected to said ring body; and a connecting link which is rotatably connected to each of the distal end portions of said pair of swing links, and said retaining body being provided at the inner end portion of the connecting link wherein, among said swing links, the length of the swing link positioned at the radial direction outer side is shorter than the length of the swing link positioned at the radial direction inner side, and when said extending/retracting means is driven by said driving means and the extending line of said connecting link practically intersects the central axis of said ring body, all of the plurality of said retaining bodies are positioned on the same circle which centers around the central axis of said ring body; and wherein said pair of links are arranged in the circumferential direction of said body; and said driving means comprising:

a cylinder rotatable connected at one end thereof to said ring body via a bracket, a piston rod accommodated in said cylinder in such a manner as to extend from or retract into the other end of said cylinder, a transmitting arm which is connected at one end thereof to said piston rod, and is fixed to any of the plurality of said extending/retracting means at the other end; and a plurality of connecting rods for transmitting driving force, the driving force being transmitted from said cylinder to said extending/retracting means, which is connected to the transmitting arm, via the transmitting arm.

10. A mechanism for retaining a bead with a filler according to claim 9, wherein each of the plurality of said connecting rods is connected to the adjacent base end portion of the radial direction outer side link, among said pair of swing links of the plurality of said extending/retracting means.

11. A mechanism for retaining a bead with a filler according to claim 10, wherein the base end portion of the swing link positioned at the radial direction outer side of said swing links is substantially triangle.

12. A mechanism for retaining a bead with a filler according to claim 9, wherein the radial direction outer end of said connecting link ends at the distal end of the swing link at the radial direction outer side of said swing links.

* * * * *